US008104257B2

(12) United States Patent
Norris et al.

(10) Patent No.: US 8,104,257 B2
(45) Date of Patent: Jan. 31, 2012

(54) TIP TURBINE ENGINE WITH MULTIPLE FAN AND TURBINE STAGES (75) Inventors: James W. Norris, Lebanon, CT (US); Craig A. Nordeen, Manchester, CT (US); Gary Roberge, Tolland, CT (US)

(73) Assignee: United Technologies Corporation, Hartford, CT (US)

(*) Notice: Subject to any disclaimer, the term of this patent is extended or adjusted under 35 U.S.C. 154(b) by 1293 days.

(21) Appl. No.: 11/719,589

(22) PCT Filed: Dec. 1, 2004

(86) PCT No.: PCT/US2004/040105
§ 371 (c)(1),
(2), (4) Date: May 17, 2007

(87) PCT Pub. No.: WO2006/059993
PCT Pub. Date: Jun. 8, 2006

(65) Prior Publication Data
US 2009/0145136 A1    Jun. 11, 2009

(51) Int. Cl.
*F02C 3/045* (2006.01)
(52) U.S. Cl. .................. 60/39.162; 60/268
(58) Field of Classification Search ............. 60/226.1, 60/39.162, 39.78, 39.43, 268, 247, 244, 225, 60/224, 245, 246, 768
See application file for complete search history.

(56) References Cited

U.S. PATENT DOCUMENTS

| | | | |
|---|---|---|---|
| 1,544,318 A | 6/1925 | Hodgkinson | |
| 2,221,685 A | 11/1940 | Smith | |
| 2,414,410 A | 1/1947 | Griffith | |
| 2,499,831 A | 3/1950 | Palmatier | |
| 2,548,975 A | 4/1951 | Hawthorne | |
| 2,611,241 A | 9/1952 | Schulz | |
| 2,620,554 A | 12/1952 | Mochel et al. | |
| 2,698,711 A | 1/1955 | Newcomb | |
| 2,801,789 A | 8/1957 | Moss | |
| 2,830,754 A | 4/1958 | Stalker | |
| 2,874,926 A | 2/1959 | Gaubatz | |

(Continued)

FOREIGN PATENT DOCUMENTS
GB             716263           9/1954
(Continued)

*Primary Examiner* — Ehud Gartenberg
*Assistant Examiner* — Vikansha Dwivedi
(74) *Attorney, Agent, or Firm* — Carlson, Gaskey & Olds, P.C.

(57) ABSTRACT

A tip turbine engine (10) provides first and second turbines (32) rotatably driven by a combustor (30) generating a high-energy gas stream. The first turbine (32) is mounted at an outer periphery of a first fan (24a), such that the first fan is rotatably driven by the first turbine (32a). The second turbine (32b) is mounted at an outer periphery of a second fan (24b), and is rotatably driven by the high-energy gas stream. In one embodiment, the first turbine (32a) rotatably drives a plurality of stages of first compressor blades (54) in an axial compressor (22) in a first rotational direction, while the second turbine (32b) rotatably drives a plurality of stages of second compressor blades (52) in the axial compressor (22) in a second rotational direction opposite the first. By rotatably driving alternating stages of compressor blades in opposite directions, the efficiency of the axial compressor (22) is increased and/or the number of stages of compressor blades can be reduced. Other variations are described in additional embodiments.

33 Claims, 5 Drawing Sheets

U.S. PATENT DOCUMENTS

| | | |
|---|---|---|
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,339,927 B1 * | 1/2002 | DiPietro, Jr. ................ 60/226.1 |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 * | 2/2004 | Paul .......................... 60/39.43 |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| GB | 785721 | 11/1957 |
| GB | 1287223 | 8/1972 |
| GB | 2016597 | 9/1979 |
| GB | 2026102 | 1/1980 |
| GB | 2401655 | 11/2004 |
| JP | 10184305 | 7/1998 |
| WO | 9902864 | 1/1999 |
| WO | 02081883 | 10/2002 |
| WO | 2004092567 | 10/2004 |
| WO | 2006059986 | 6/2006 |
| WO | 2006059987 | 6/2006 |
| WO | 2006059993 | 6/2006 |
| WO | 2006112807 | 12/2006 |
| WO | 2006110125 | 2/2007 |

* cited by examiner

TIP TURBINE ENGINE WITH MULTIPLE FAN AND TURBINE STAGES

BACKGROUND OF THE INVENTION

The present invention relates to a turbine engine, and more particularly to a tip turbine engine with multiple fan stages and/or multiple tip turbine stages.

An aircraft gas turbine engine of the conventional turbofan type generally includes a forward bypass fan, a low pressure compressor, a high pressure compressor, a combustor, a high pressure turbine, and a low pressure turbine, all located along a common longitudinal axis. The low and high pressure compressors are rotatably driven to compress entering air to a relatively high pressure. This high pressure air is then mixed with fuel in the combustor, where it is ignited to form a high energy gas stream. This gas stream flows axially aft to rotatably drive the high pressure turbine, which rotatably drives the high pressure compressor via a high spool shaft. The gas stream leaving the high pressure turbine is expanded through the low pressure turbine, which rotatably drives the forward bypass fan and low pressure compressor via a low spool shaft.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines include hollow fan blades that receive core airflow therethrough such that the hollow fan blades operate as centrifugal compressors. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

In some tip turbine engine designs, core airflow may be compressed by an axial compressor before entering the hollow fan blades for further, centrifugal compression. The axial compressor may include an axial compressor rotor with one or more stages of radially-extending compressor blades alternated with stages of static compressor vanes. Increasing the number of stages of compressor blades and compressor vanes increases the compression of the core airflow and the efficiency of the engine, but increases the overall length and weight of the engine and the number of parts.

SUMMARY OF THE INVENTION

A tip turbine engine according to a first embodiment of the present invention provides first and second turbines rotatably driven in opposite directions by a combustor generating a high-energy gas stream. The first turbine is mounted at an outer periphery of a first fan, such that the first fan is rotatably driven in a first rotational direction by the first turbine when the first turbine is driven in the first rotational direction by the high-energy gas stream. The second turbine is mounted at an outer periphery of a second fan, and is rotatably driven in a second rotational direction opposite the first rotational direction by the high-energy gas stream, such that the second turbine then rotatably drives the second fan in the second rotational direction opposite the first rotational direction.

The first turbine rotatably drives a plurality of stages of first compressor blades in an axial compressor, while the second turbine rotatably drives a plurality of stages of second compressor blades in the axial compressor. In one embodiment, the compression of the axial compressor is increased by rotatably driving alternating stages of compressor blades in opposite directions. As a result, it may be possible to reduce the number of stages of axial compressor blades.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
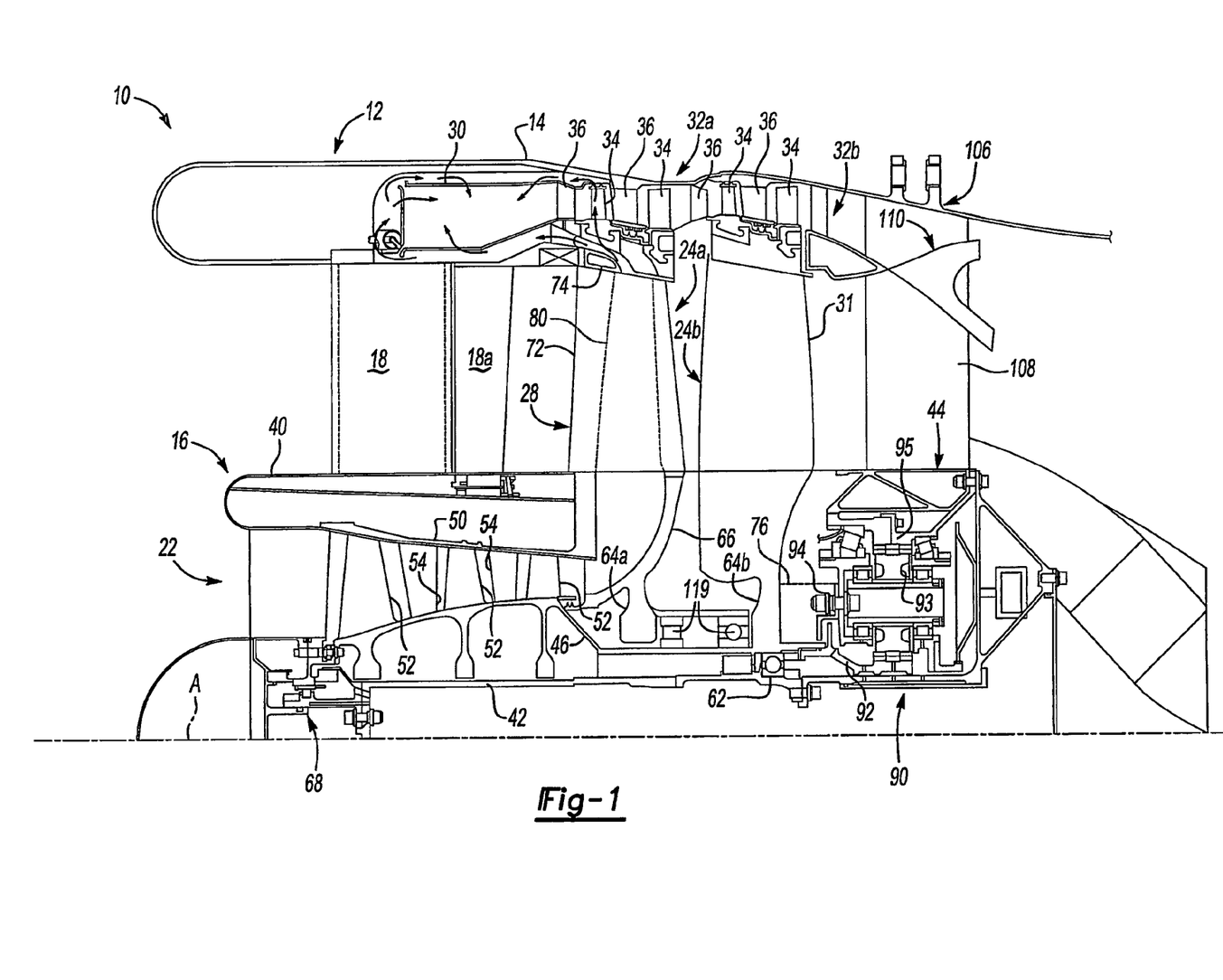
FIG. 1 is a partial sectional perspective view of a tip turbine engine according to a first embodiment of the present invention.

FIG. 1 illustrates a partial sectional view of a tip turbine engine (TTE) type gas turbine engine 10 taken along engine centerline A. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18a. An axial compressor 22 is preferably located along the engine centerline A and receives core airflow.

A plurality (two in the embodiment shown) of fan-turbine rotor assemblies 24a-b are mounted for rotation about the engine centerline A aft of the axial compressor 22. The first fan-turbine rotor assembly 24a includes a plurality of hollow fan blades 28 extending radially outwardly to provide internal, centrifugal compression of the compressed core airflow from the axial compressor 22 for distribution to an annular combustor 30 located within the rotationally fixed static outer support structure 14. The second fan-turbine rotor assembly 24b is axially aft of the first fan-turbine rotor assembly 24a and includes a plurality of fan blades 31 extending radially outwardly.

First and second turbines 32a-b are mounted to outer ends of the fan blades 28, 31 of the fan-turbine rotor assemblies 24a-b, respectively. Each turbine 32a-b includes a plurality of tip turbine blades 34 (two stages shown in each turbine 32a-b) which rotatably drive the fan-turbine rotor assemblies 24a-b relative a plurality of tip turbine stators 36 which extend radially inwardly from the rotationally fixed static outer support structure 14. The annular combustor 30 is disposed axially forward of the first turbine 32a and second turbine 32b. The first turbine 32a is oriented to be driven rotatably by the high-pressure gas stream exiting the annular combustor 30 in a first rotational direction, while the second turbine 32b is driven by the high-pressure gas stream in a second rotational direction opposite the first rotational direction. The first fan-turbine rotor assembly 24a is oriented to provide forward thrust to the engine 10 when driven by the first turbine 32a in the first rotational direction. The second fan-turbine rotor assembly 24b is oriented to provide forward thrust to the engine 10 when driven by the second turbine 32b in the second rotational direction.

The rotationally fixed static inner support structure 16 includes a splitter 40, a static inner support housing 42 and a static outer support housing 44 located coaxial to said engine centerline A.

The axial compressor 22 includes an inner compressor rotor 46, from which a plurality of inner compressor blades 52 extend radially outwardly, and an outer compressor rotor 50, rotatably mounted within the splitter 40. A plurality of stages of outer compressor blades 54 extend radially inwardly from the outer compressor rotor 50 between stages of the inner compressor blades 52. The inner compressor blades 52 and outer compressor blades 54 are arranged circumferentially about the inner compressor rotor 46 in stages. Although three stages of inner compressor blades 52 and two stages of outer compressor blades 54 are shown in this example, more or fewer stages could also be utilized and it is contemplated that fewer stages could be utilized because of the increased compression created by the counter-rotating inner and outer compressor blades 52, 54. The inner compressor rotor 46 is mounted for rotation upon the static inner support housing 42 through a forward bearing assembly 68 and an aft bearing assembly 62.

The first fan-turbine rotor assembly 24a includes a first fan hub 64a that supports the plurality of the hollow fan blades 28. Each fan blade 28 includes an inducer section 66, a hollow fan blade section 72 and a diffuser section 74. The inducer section 66 receives airflow from the axial compressor 22 in a direction generally parallel to the engine centerline A and turns the airflow from an axial airflow direction toward a radial airflow direction. The airflow is radially communicated through a core airflow passage 80 which acts as a compressor chamber within the hollow fan blade section 72 where the airflow is centrifugally compressed. The diffuser section 74 receives the airflow from the core airflow passage 80, and then diffuses the airflow and turns it once again toward an axial airflow direction toward the annular combustor 30. Preferably, the airflow is diffused axially forward in the engine 10, however, the airflow may alternatively be communicated in another direction.

The second fan-turbine rotor assembly 24b includes a second fan hub 64b that supports the plurality of fan blades 31. These fan blades 31 are not acting as centrifugal compressors like the hollow fan blades 28 in the first fan-turbine rotor assembly 24a. The angle of the fan blades 31 on the second fan-turbine rotor assembly 24b is matched with the fan blades 28 on the first fan-turbine rotor assembly 24a. Alternatively, static vanes (not shown) may be mounted between the fan blades 28 and the fan blades 31.

The first fan-turbine rotor assembly 24a is secured to the outer compressor rotor 50, such that the outer compressor rotor 50 rotates with the first fan-turbine rotor assembly 24a. The second fan-turbine rotor assembly 24b is coupled to the inner compressor rotor 46, such that the inner compressor rotor 46 rotates with the second fan-turbine rotor assembly 24b. The inner compressor rotor 46 may optionally be coupled to the second fan-turbine rotor assembly 24b via coupling 76 (shown schematically in phantom) and a gearbox assembly 90 which increases the rate of rotation of the inner compressor rotor 46 over the rate of the second fan-turbine rotor assembly 24b, such as at a ratio of 3.34.

The optional gearbox assembly 90 may be a planetary gearset including a sun gear 92 coupled to the inner compressor rotor 46 and a planet carrier 94 coupled to the second fan-turbine rotor assembly 24b. A plurality of planet gears 93 (one shown) are mounted to the planet carrier 94. The planet gears 93 engage the sun gear 92 and a ring gear 95. Rotating the inner compressor rotor 46 at a rate higher than that of the second fan-turbine rotor assembly 24b increases the compression provided by the axial compressor 22. Alternatively, the gearbox assembly 90 could provide a speed decrease between the second fan-turbine rotor assembly 24b and the inner compressor rotor 46.

Figures 2, 3:
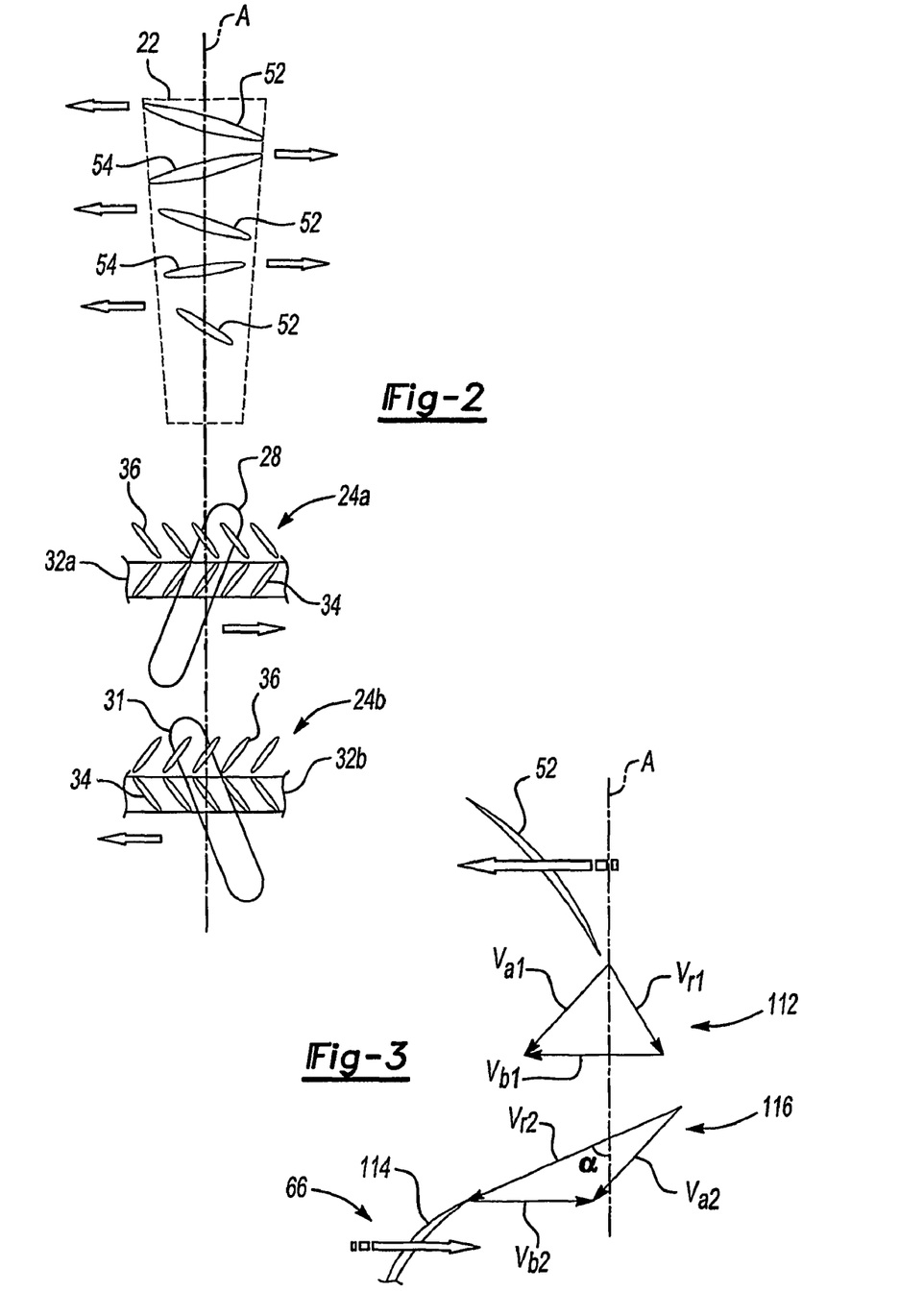
FIG. 2 is a schematic view showing the operation and interaction of the multiple fan stages, turbine stages and the axial compressor rotors.
FIG. 3 illustrates the relationship of the angles of the last stage of compressor blades and the inducer sections in the counter-rotating axial compressor rotor of FIG. 1.

FIG. 2 schematically illustrates the operation and interaction of the fan-turbine rotor assemblies 24a-b, turbines 32a-b, and the inner and outer compressor blades 52, 54. As shown, the fan blades 28 of the first fan-turbine rotor assembly 24a are oriented to provide forward thrust to the engine 10 when driven by the first turbine 32a in the first rotational direction (to the right, in FIG. 2). The fan blades 31 of the second fan-turbine rotor assembly 24b are oriented to provide forward thrust to the engine 10 when driven by the second turbine 32b in the second rotational direction (to the left, in FIG. 2). The first fan-turbine rotor assembly 24a is secured to the outer compressor rotor 50 (not shown in FIG. 2) and outer compressor blades 54, such that the outer compressor blades 54 rotate with the first fan-turbine rotor assembly 24a in the first direction. The outer compressor blades 54 are oriented to axially compress core airflow by rotating in the first direction. The second fan-turbine rotor assembly 24b is coupled to the inner compressor rotor 46 (not shown in FIG. 2) and inner compressor blades 52, such that the inner compressor blades 52 rotate with the second fan-turbine rotor assembly 24b in the second direction. The inner compressor blades 52 are oriented to axially compress core airflow by rotating in the second direction. By providing alternating, counter-rotating inner and outer compressor blades 52, 54, rather than simply inner compressor blades alternated with static compressor vanes as in the prior art, the axial compressor 22 provides increased compression and/or the number of stages of inner and outer compressor blades 52, 54 may be reduced. In the embodiment shown, only two stages of outer compressor blades 54 are utilized, so that the last stage of inner compressor blades 52, which are counter-rotating relative to the first fan-turbine rotor assembly 24a are immediately adjacent the inducer sections 66 (FIG. 1), as will be explained below with respect to FIG. 3.

FIG. 3 illustrates the relationship of the angle of the inner compressor blades 52 (one shown) in the last stage of inner compressor blades 52 to the inducer sections 66 in the engine 10 of FIG. 1. The counter-rotation of the inner compressor blades 52 relative to the inducer sections 66 permits the final stage of inner compressor blades 52 to be positioned immediately adjacent the inducer sections 66, thereby eliminating an otherwise-necessary intervening stage of static compressor vanes. Referring to the compressor blade velocity triangle 112 in FIG. 3, the inner compressor blade 52 is angled relative to the engine centerline A, which gives an angle of a relative velocity vector, $v_{r1}$. The velocity of the inner compressor blade 52 gives a blade velocity vector, $v_{b1}$. The resultant vector, indicating the resultant core airflow from the inner compressor blade 52, is the absolute velocity vector, $v_{a1}$. The leading edge 114 of the inducer section 66 is angled to efficiently receive the core airflow from the inner compressor blade 52, which flows toward the inducer section 66 at the absolute velocity vector, $v_{a1}$. The absolute velocity vector, $v_{a1}$, is reproduced as absolute velocity vector, $v_{a2}$ in the inducer velocity triangle 116. Since the inducer section 66 is moving as shown by blade velocity vector $v_{b2}$, the leading edge 114 is angled parallel to a relative velocity vector $v_{r2}$, which together with blade velocity vector $v_{b2}$ would result in absolute velocity vector, $v_{a2}$, to match the angle of the core airflow incoming from the inner compressor blade 52. The specific angles will depend on a variety of factors, including anticipated blade velocities and the design choices made in the earlier stages of the inner and outer compressor blades 52, 54.

In operation, referring to FIGS. 1 and 2, air enters the axial compressor 22, where it is compressed by the multiple stages of the inner compressor blades 52 and outer compressor blades 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow enters the diffuser section 74, where it is turned and diffused axially forward in the engine 10 into the annular combustor 30. The compressed core airflow from the hollow fan blades 28 is mixed with fuel in the annular combustor 30, where it is ignited to form a high-energy gas stream. The high-energy gas stream is expanded over the plurality of tip turbine blades 34 mounted about the outer periphery of the first fan-turbine rotor assembly 24a to drive the first fan-turbine rotor assembly 24a in the first rotational direction, which in turn drives the outer compressor rotor 50 of the axial compressor 22 in the first rotational direction. The second fan-turbine rotor assembly 24b is rotatably driven by the high-energy gas stream in the second rotational direction, opposite the first rotational direction, to drive the inner compressor rotor 46 in the second rotational direction, optionally via the gearbox assembly 90. The counter-rotation of the inner compressor blades 52 and outer compressor blades 54 increases the compression of the core airflow by the axial compressor 22.

Concurrent therewith, the first and second fan-turbine rotor assemblies 24a-b discharge fan bypass air axially aft to merge with the core airflow from the first and second turbines 32a-b in an exhaust case 106. A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the turbine blades 34 with the bypass airflow from the fan blades 28, 31.

Figure 4:
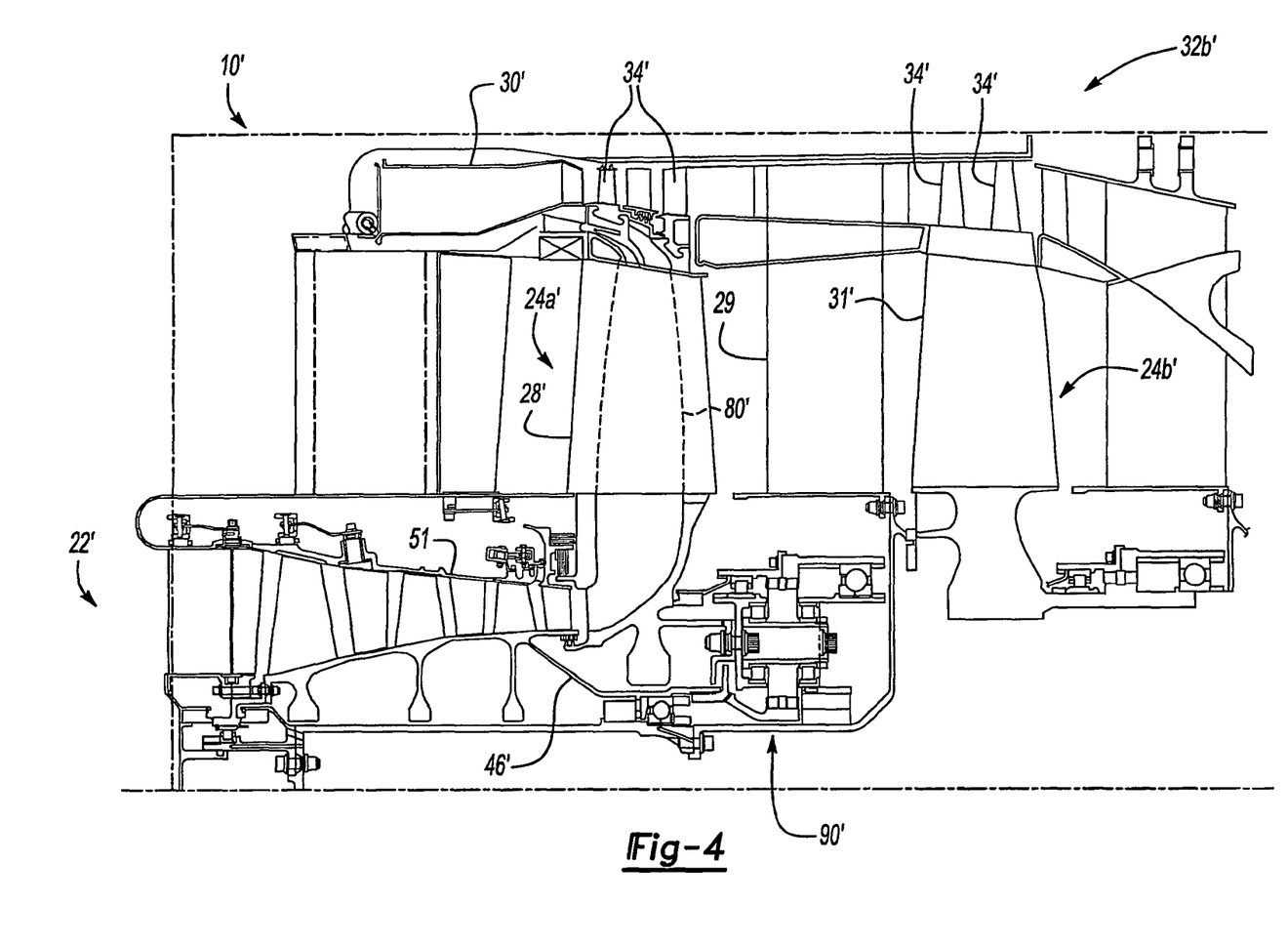
FIG. 4 illustrates a tip turbine engine according to second embodiment of the present invention.

FIG. 4 illustrates a tip turbine engine 10' according to a second embodiment of the present invention. To the extent not otherwise specified, the components of the tip turbine engine 10' are similar to those in the first embodiment and function similarly. To the extent the similar components of the tip turbine engine 10' are described with respect to FIG. 4, they are designated with the same reference numerals as before with a prime designation added. The tip turbine engine 10' again includes a second fan-turbine rotor assembly 24b' that is rotatable independently of the first fan-turbine rotor assembly 24a'. In this embodiment, the first fan-turbine rotor assembly 24a' drives the inner compressor rotor 46' via the gearbox assembly 90' and the axial compressor 22' includes a fixed compressor case 51. The second fan-turbine rotor assembly 24b' does not drive the axial compressor 22' as in the first embodiment, but does increase the fan pressure ratio of the turbine engine 10' as in the first embodiment. In the embodiment shown, the second fan-turbine-rotor assembly 24b' rotates in the same direction as the first fan-turbine-rotor assembly 24a', but it could alternatively counter-rotate.

Referring to the two embodiments shown in FIGS. 1 and 4, in order to provide the energy required to drive the second fan-turbine rotor assembly 24b, 24b', it may be necessary to increase the exit temperature of the annular combustor 30, 30'. Because the second fan-turbine rotor assembly 24b, 24b' does not require an airfoil thickness capable of containing the core airflow passage 80, 80', the aerodynamics of the fan blades 31, 31' of the second fan-turbine rotor assembly 24b, 24b' can be better optimized. Additional stages, either with or without their own tip turbine could be used to increase fan pressure ratio even further. Although the second fan-turbine rotor assembly 24b, 24b' in both embodiments rotates independently of the first fan-turbine rotor assembly 24a, 24a', they could alternatively be mechanically coupled together, either directly or via a gear. As shown in FIG. 1, the first fan-turbine rotor assembly 24a may be supported on bearings 119 supported on the second fan hub 64b, or, as shown in FIG. 4, a frame 29 may separately support the second fan-turbine rotor assembly 24b'.

As the span and blade mass of the turbine blades 34' increase (in the second embodiment shown in FIG. 4, the turbine blades 34' associated with the second fan-turbine rotor assembly 24b' are longer than the turbine blades 34' associated with the first fan-turbine rotor assembly 24a'), it may be desirable to have the second fan-turbine rotor assembly 24b' operate at a slower mechanical speed than the first fan-turbine rotor assembly 24a'.

Figure 5:
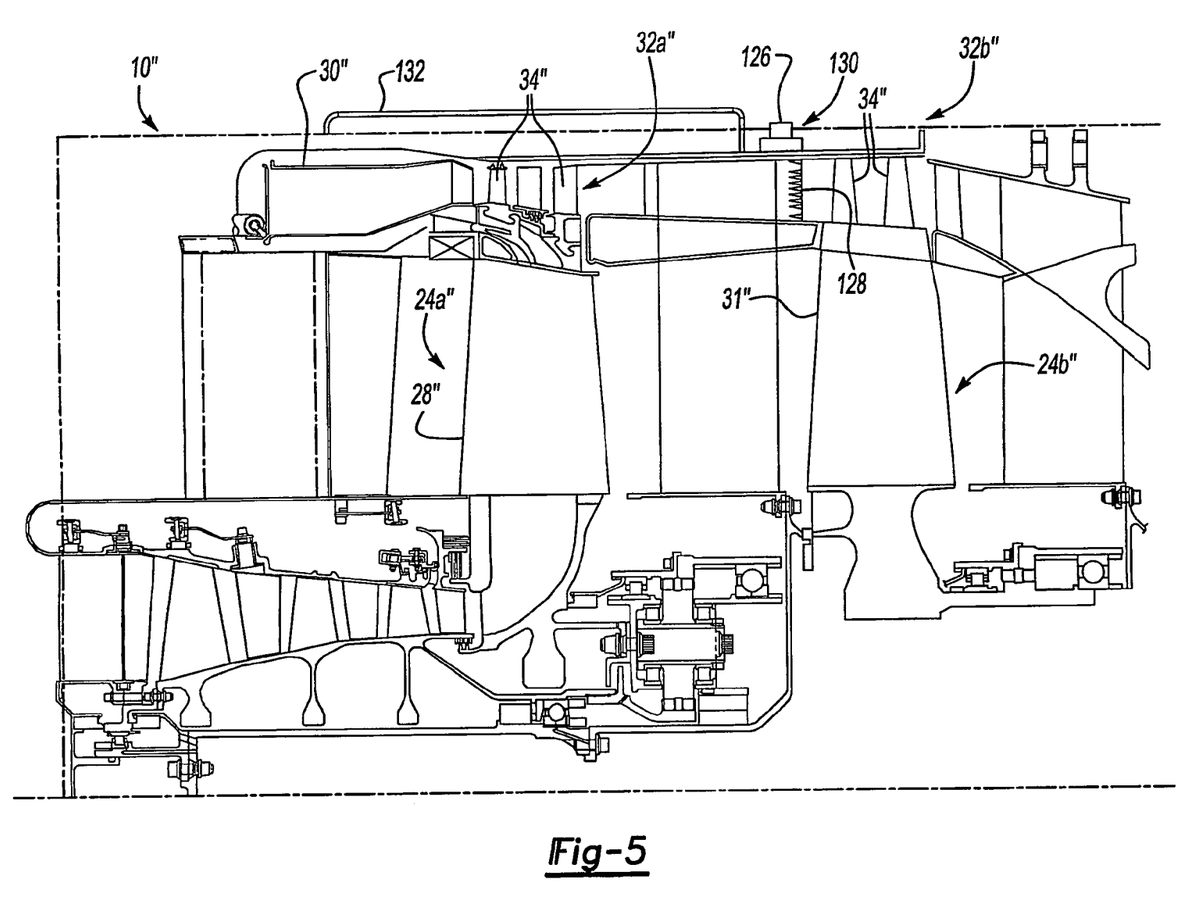
FIG. 5 illustrates a tip turbine engine according to third embodiment of the present invention.

FIG. 5 illustrates a tip turbine engine 10" according to a third embodiment of the present invention. To the extent not otherwise specified, the components of the tip turbine engine 10" are similar to those in the second embodiment and function similarly. To the extent the similar components of the tip turbine engine 10" are described with respect to FIG. 5, they are designated with the same reference numerals as before with a double prime designation added. The tip turbine engine 10" again includes a second fan-turbine rotor assembly 24b" that is rotatable independently of the first fan-turbine rotor assembly 24a". In this embodiment, a fuel injection system 126 is integrated into a turbine vane 128 between the turbines 32a", 32b" to form an inter-turbine combustor 130. The trailing edge of the inter-turbine vane 128 may be truncated to provide localized areas compatible with stabilized combustion, although alternative forms of the combustor 130 may provide the same effect. If necessary, non-vitiated air (i.e., a small amount of compressor bleed air routed to the inter-turbine combustor 130 via conduit 132) could be introduced to assist combustion or provide a high pressure source of air for flame stabilization. Use of the inter-turbine combustor 130 augments or boosts the inter-turbine stage temperature, allowing the turbine 32b" on the second fan-turbine rotor assembly 24b" to have fewer stages and/or fewer airfoils per stage. This may also permit the blades 34" to be shorter, significantly reducing levels of parasitic centrifugally induced radial load for the second fan-turbine rotor assembly 24b". These characteristics allow this embodiment to operate at higher mechanical speeds, and therefore provide higher fan pressure ratios as compared to the second embodiment. Additionally, in this embodiment, the use of the inter-turbine combustor 130 could maintain maximum temperatures in the annular combustor 30" and the inter-turbine combustor 130 at temperatures low enough to allow a near zero turbine cooling and leakage turbine, which would provide thrust specific fuel consumption benefits.

Figure 6:
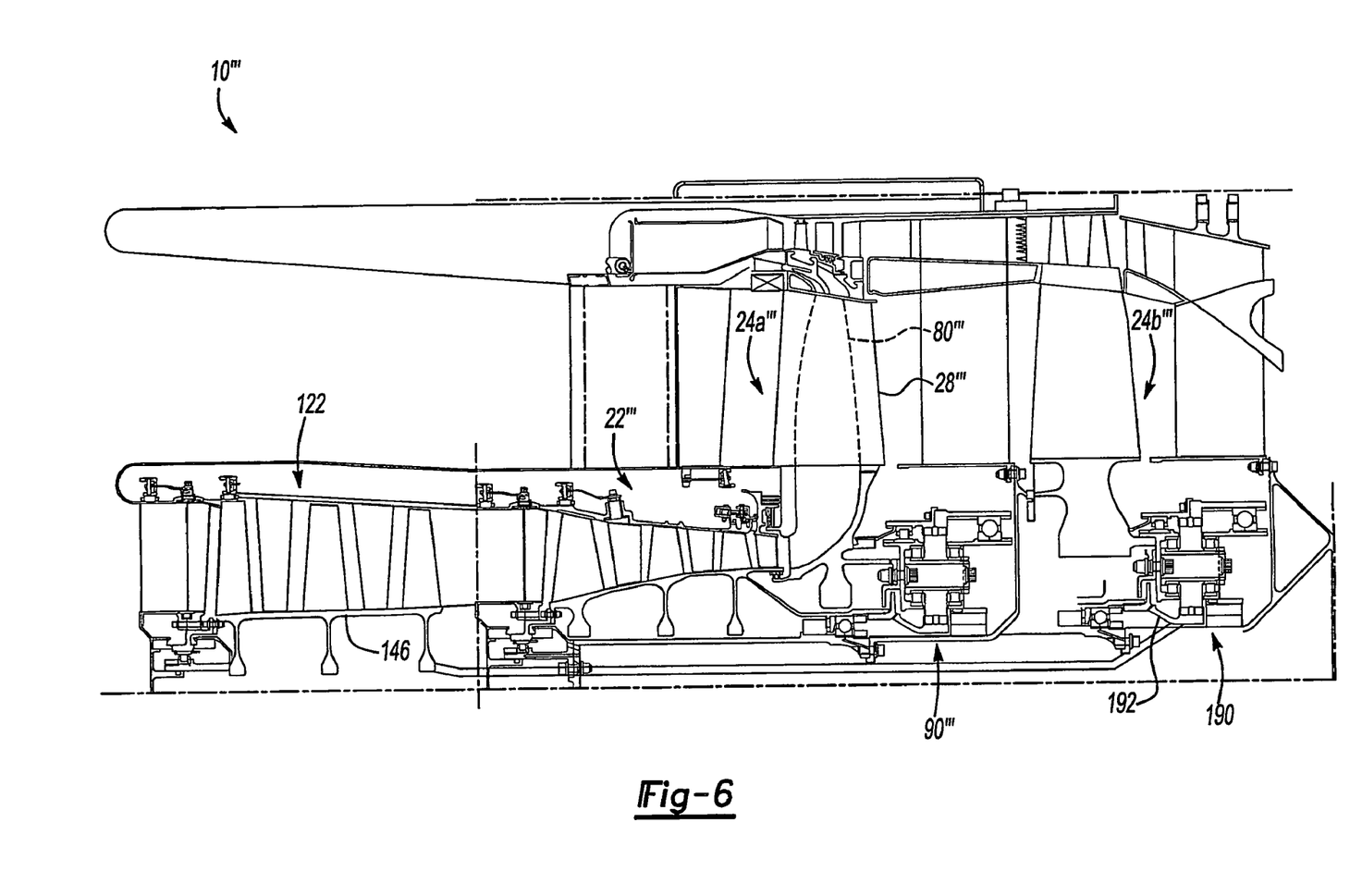
FIG. 6 illustrates a tip turbine engine according to fourth embodiment of the present invention.

FIG. 6 illustrates a tip turbine engine 10''' according to a fourth embodiment of the present invention. To the extent not otherwise specified, the components of the tip turbine engine 10''' are similar to those in the third embodiment and function similarly. To the extent the similar components of the tip turbine engine 10''' are described with respect to FIG. 6, they are designated with the same reference numerals as before with a triple prime designation added. The fourth embodiment provides a way of increasing the overall pressure ratio of the turbine engine 10'''. In this embodiment, the available work from the second turbine 32b''' is split between driving a low pressure axial compressor 122 and the second fan-turbine rotor assembly 24b'''. A second planetary gearbox assembly 190, similar to gearbox assembly 90''', has a sun output shaft 192 which drives a compressor rotor 146 in the low pressure axial compressor 122. In this embodiment, the overall pressure ratio can be boosted by a factor of about 3.5 (for example). For subsonic applications, the optimum match may suggest that boosting the overall pressure ratio through the low pressure axial compressor 122, with reduced emphasis on augmenting the fan pressure ratio, is desirable. For higher speed applications, which may place greater emphasis on a balance between specific thrust and thrust specific fuel consumption, lower levels of overall pressure ratio with higher fan pressure ratios may be preferred. Boosting the pressure ratio prior to entering the core airflow passages 80''' in the hollow fan blades 28''' has an additional benefit of reducing the physical flow area required for the core airflow passages 80''' within each hollow fan blade 28'''. This may result in a reduced thickness to chord ratio for the first fan-turbine rotor assembly 24a''', or in reduced chord. Either result may improve the fan stage aerodynamic efficiency.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising:
a first fan having a first plurality of fan blades rotatably driven about an axis in a first rotational direction by a first turbine at an outer circumference of the first fan; and
a second fan having a second plurality of fan blades rotatably driven about the axis in a second rotational direction by a second turbine at an outer circumference of the second fan, the second rotational direction being opposite the first rotational direction.

2. The turbine engine of claim 1 further comprising an axial compressor having a first plurality of compressor blades rotatably driven by the first fan.

3. The turbine engine of claim 2 wherein the axial compressor further includes a second plurality of compressor blades rotatably driven by the second fan.

4. The turbine engine of claim 3 wherein the first plurality of compressor blades is rotatably driven in the first rotational direction and the second plurality of compressor blades is rotatably driven in the second rotational direction.

5. The turbine engine of claim 3 wherein at least one of the first plurality of fan blades defines a compressor chamber extending radially therein, wherein rotation of the at least one of the first plurality of fan blades provides centrifugal compression of core airflow.

6. The turbine engine of claim 5 wherein the axial compressor compresses core airflow leading into the compressor chamber, wherein the compressed core airflow is then further compressed in the compressor chamber.

7. The turbine engine of claim 5 further including at least one combustor proximate an outlet of the compressor chamber, the core airflow from the compressor chamber being mixed with fuel and ignited in the combustor to produce a high-energy gas stream that drives the first turbine and the second turbine.

8. The turbine engine of claim 1 further comprising an axial compressor having a plurality of stages of first compressor blades rotatably driven by the first fan in the first direction, the axial compressor further including a plurality of stages of second compressor blades alternating with the plurality of stages of first compressor blades, the second compressor blades rotatably driven by the second fan in the second direction.

9. The turbine engine of claim 8 further including a combustor generating a high-energy gas stream to rotatably drive the first turbine and the second turbine.

10. A turbine engine comprising:
a first fan having a first plurality of fan blades rotatably driven in a first rotational direction by a first turbine at an outer circumference of the first fan, at least one of the first plurality of fan blades defining a compressor chamber extending radially therein, wherein rotation of the at least one of the first plurality of fan blades provides centrifugal compression of core airflow carried in the compressor chamber; and
a second fan downstream of the first fan, the second fan having a second plurality of fan blades rotatably driven in a second rotational direction opposite the first rotational direction.

11. The turbine engine of claim 10 further comprising an axial compressor having a first plurality of compressor blades rotatably driven by one of the first and the second fans.

12. The turbine engine of claim 11 wherein the axial compressor further includes a second plurality of compressor blades adjacent the first plurality of compressor blades, the second plurality of compressor blades rotatably driven by the other of the first and second fans.

13. The turbine engine of claim 10 further including at least one combustor proximate an outlet of the compressor chamber, the combustor generating a high-energy gas stream to rotatably drive the first turbine.

14. The turbine engine of claim 13 further including a second turbine at an outer circumference of the second fan, the second turbine rotatably driving the second fan in the second rotational direction.

15. A turbine engine comprising:
a combustor generating a high-energy gas stream;
a first fan having a first plurality of fan blades extending radially outwardly and rotatable about an axis;
a first turbine at an outer periphery of the first fan, the first turbine rotatably driven in a first rotational direction by the high-energy gas stream from the combustor, the first fan thereby rotatably driven in the first rotational direction by the first turbine; and
a second turbine rotatably driven by the high-energy gas stream, wherein the second turbine is driven in a second rotational direction opposite the first rotational direction, wherein the second turbine is mounted to an outer periphery of a second fan having a second plurality of fan blades, the second fan rotatably driven in the second rotational direction by the second turbine.

16. The turbine engine of claim 15 wherein the second turbine is downstream of the first turbine.

17. The turbine engine of claim 15 further including an axial compressor having a first plurality of compressor airfoils rotatably driven by one of the first turbine and the second turbine.

18. The turbine engine of claim 17 further including a second plurality of compressor airfoils rotatably driven by the other of the first turbine and the second turbine.

19. The turbine engine of claim 18 wherein the second turbine is driven in a second rotational direction opposite the first rotational direction.

20. The turbine engine of claim 18 wherein the second plurality of compressor airfoils are alternately spaced axially from the first plurality of compressor airfoils.

21. The turbine engine of claim 18 wherein all of the second plurality of compressor airfoils are spaced axially aft of all of the first plurality of compressor airfoils.

22. The turbine engine of claim 15 wherein the combustor is a first combustor, the turbine engine further including a second combustor between the first combustor and the second turbine.

23. A turbine engine comprising:
- a first combustor generating a first high-energy gas stream;
- a first fan having a first plurality of fan blades extending radially outwardly and rotatable about an axis;
- a first turbine at an outer periphery of the first fan, the first turbine rotatably driven in a first rotational direction by the first high-energy gas stream, the first fan thereby rotatably driven by the first turbine;
- a second combustor generating a second high-energy gas stream; and
- a second turbine rotatably driven by the second high-energy gas stream, wherein the second turbine rotatably drives a second fan having a second plurality of fan blades.

24. The turbine engine of claim 23 wherein the second turbine is rotatably driven by a combination of the first high-energy gas stream and the second high-energy gas stream.

25. The turbine engine of claim 23 wherein the second turbine drives a second plurality of compressor airfoils in an axial compressor.

26. The turbine engine of claim 25 wherein the first turbine drives a first plurality of compressor airfoils.

27. The turbine engine of claim 26 wherein the first plurality of compressor airfoils are in the axial compressor.

28. The turbine engine of claim 1 further comprising a first combustor at the outer circumference of the first fan and a second combustor at the outer periphery of the second fan.

29. The turbine engine of claim 10 further comprising a first combustor at the outer circumference of the first fan and a second combustor at the outer periphery of the second fan.

30. The turbine engine of claim 15 further comprising a first combustor at the outer circumference of the first fan and a second combustor at the outer periphery of the second fan.

31. The turbine engine of claim 2 wherein the axial compressor is axially forward of the first fan.

32. The turbine engine of claim 15, wherein the first turbine has a first set of turbine blades and the second turbine has a second set of turbine blades, wherein the second set of turbine blades extend a longer radial length than the first set of turbine blades.

33. The turbine engine of claim 26, wherein the plurality of first compressor airfoils is axially forward of the plurality of second compressor airfoils.

* * * * *